(12) United States Patent
Aoki

(10) Patent No.: US 6,718,186 B2
(45) Date of Patent: Apr. 6, 2004

(54) MELODY PLAYING SYSTEM

(75) Inventor: Eriko Aoki, Saitama (JP)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 09/769,383

(22) Filed: Jan. 26, 2001

(65) Prior Publication Data

US 2001/0012793 A1 Aug. 9, 2001

(30) Foreign Application Priority Data

Jan. 28, 2000 (JP) ........................................ 2000-020095

(51) Int. Cl.[7] ................................................ H04M 1/00
(52) U.S. Cl. ................. 455/567; 455/550.1; 455/401; 455/415
(58) Field of Search ................. 455/567, 566, 455/401, 550.1, 575.1, 412.1, 414.4, 415, 412.2; 340/825.24, 825.25; 379/374.01, 374.02, 375.01, 179, 180, 185

(56) References Cited

U.S. PATENT DOCUMENTS

| | | | | |
|---|---|---|---|---|
| 4,417,494 A | * | 11/1983 | Nakada et al. ................. 84/612 |
| 6,094,587 A | * | 7/2000 | Armanto et al. ............. 455/567 |
| 6,308,086 B1 | * | 10/2001 | Yoshino ..................... 455/567 |
| 6,337,972 B1 | * | 1/2002 | Jones et al. ................. 340/7.57 |
| 6,366,791 B1 | * | 4/2002 | Lin et al. .................... 455/567 |
| 6,496,692 B1 | * | 12/2002 | Shanahan ................... 455/418 |
| 6,501,967 B1 | * | 12/2002 | Makela et al. ............. 455/567 |
| 6,549,767 B1 | * | 4/2003 | Kawashima ............. 455/412.2 |

FOREIGN PATENT DOCUMENTS

| | | |
|---|---|---|
| JP | 10-288985 | 10/1988 |
| JP | 11-305777 | 5/1999 |

OTHER PUBLICATIONS

Japanese Office dated Oct. 6, 2003 with English translation of pertinent portions

* cited by examiner

Primary Examiner—Sonny Trinh
(74) Attorney, Agent, or Firm—Whitham, Curtis & Christofferson, P.C.

(57) ABSTRACT

A cellular phone has a melody playing system for playing a melody upon a call sign of the cellular phone. The playing system has a control unit which retrieves tone data including pitch data and a note data, calculates the sound time length and the wait time of each tone based on the tempo data and data for relative time lengths of the sound notes. The storage capacity for the melody can be reduced, and the user can easily modify the melody.

18 Claims, 16 Drawing Sheets

FIG. 4
PRIOR ART

PITCH DATA

| CODE | SCALE | OCTAVE | CODE | SCALE | OCTAVE |
|------|-------|--------|------|-------|--------|
| 0xFF | NO SOUND | - | 0x11 | Fa | MIDDLE OCTAVE |
| 0xFE | CONTINUE | - | 0x12 | Fa# | MIDDLE OCTAVE |
| 0x00 | Do | LOWER OCTAVE | 0x13 | Sol | MIDDLE OCTAVE |
| 0x01 | Do# | LOWER OCTAVE | 0x14 | Sol# | MIDDLE OCTAVE |
| 0x02 | Re | LOWER OCTAVE | 0x15 | La | MIDDLE OCTAVE |
| 0x03 | Re# | LOWER OCTAVE | 0x16 | La# | MIDDLE OCTAVE |
| 0x04 | Mi | LOWER OCTAVE | 0x17 | Si | MIDDLE OCTAVE |
| 0x05 | Fa | LOWER OCTAVE | 0x18 | Do | HIGHER OCTAVE |
| 0x06 | Fa# | LOWER OCTAVE | 0x19 | Do# | HIGHER OCTAVE |
| 0x07 | Sol | LOWER OCTAVE | 0x1A | Re | HIGHER OCTAVE |
| 0x08 | Sol# | LOWER OCTAVE | 0x1B | Re# | HIGHER OCTAVE |
| 0x09 | La | LOWER OCTAVE | 0x1C | Mi | HIGHER OCTAVE |
| 0x0A | La# | LOWER OCTAVE | 0x1D | Fa | HIGHER OCTAVE |
| 0x0B | Si | LOWER OCTAVE | 0x1E | Fa# | HIGHER OCTAVE |
| 0x0C | Do | MIDDLE OCTAVE | 0x1F | Sol | HIGHER OCTAVE |
| 0x0D | Do# | MIDDLE OCTAVE | 0x20 | Sol# | HIGHER OCTAVE |
| 0x0E | Re | MIDDLE OCTAVE | 0x21 | La | HIGHER OCTAVE |
| 0x0F | Re# | MIDDLE OCTAVE | 0x22 | La# | HIGHER OCTAVE |
| 0x10 | Mi | MIDDLE OCTAVE | 0x23 | Si | HIGHER OCTAVE |

FIG. 5
PRIOR ART

PITCH DATA

| CODE | SCALE | FREQUENCY (Hz) | CODE | SCALE | FREQUENCY (Hz) |
|---|---|---|---|---|---|
| 0x00 | Do | 261.7 | 0x12 | Fa# | 740.0 |
| 0x01 | Do# | 277.2 | 0x13 | Sol | 784.0 |
| 0x02 | Re | 293.7 | 0x14 | Sol# | 830.6 |
| 0x03 | Re# | 311.2 | 0x15 | La | 880.0 |
| 0x04 | Mi | 329.7 | 0x16 | La# | 932.3 |
| 0x05 | Fa | 349.3 | 0x17 | Si | 987.8 |
| 0x06 | Fa# | 370.0 | 0x18 | Do | 1046.5 |
| 0x07 | Sol | 392.0 | 0x19 | Do# | 1108.7 |
| 0x08 | Sol# | 415.3 | 0x1A | Re | 1174.7 |
| 0x09 | La | 440.0 | 0x1B | Re# | 1244.5 |
| 0x0A | La# | 466.2 | 0x1C | Mi | 1318.5 |
| 0x0B | Si | 493.9 | 0x1D | Fa | 1396.9 |
| 0x0C | Do | 523.3 | 0x1E | Fa# | 1480.0 |
| 0x0D | Do# | 554.4 | 0x1F | Sol | 1568.0 |
| 0x0E | Re | 587.3 | 0x20 | Sol# | 1661.2 |
| 0x0F | Re# | 622.3 | 0x21 | La | 1760.0 |
| 0x10 | Mi | 659.3 | 0x22 | La# | 1864.7 |
| 0x11 | Fa | 698.5 | 0x23 | Si | 1975.5 |

FIG. 7
PRIOR ART

| TYPE OF NOTE | 60 | 72 | 84 | 96 | 108 | 114 | 126 | 138 |
|---|---|---|---|---|---|---|---|---|
| WHOLE NOTE | 4.000 | 3.333 | 2.857 | 2.500 | 2.222 | 2.105 | 1.905 | 1.739 |
| DOTTED HALF NOTE | 3.000 | 2.500 | 2.143 | 1.875 | 1.667 | 1.579 | 1.429 | 1.304 |
| HALF NOTE | 2.000 | 1.667 | 1.429 | 1.250 | 1.111 | 1.053 | 0.952 | 0.870 |
| DOTTED QUARTER NOTE | 1.500 | 1.250 | 1.071 | 0.938 | 0.833 | 0.789 | 0.714 | 0.652 |
| QUARTER NOTE | 1.000 | 0.833 | 0.714 | 0.625 | 0.556 | 0.526 | 0.476 | 0.435 |
| DOTTED OCTANT NOTE | 0.750 | 0.625 | 0.536 | 0.469 | 0.417 | 0.395 | 0.357 | 0.326 |
| OCTANT NOTE | 0.500 | 0.417 | 0.367 | 0.313 | 0.278 | 0.263 | 0.238 | 0.217 |
| SIXTEENTH NOTE | 0.250 | 0.208 | 0.179 | 0.156 | 0.139 | 0.132 | 0.119 | 0.109 |

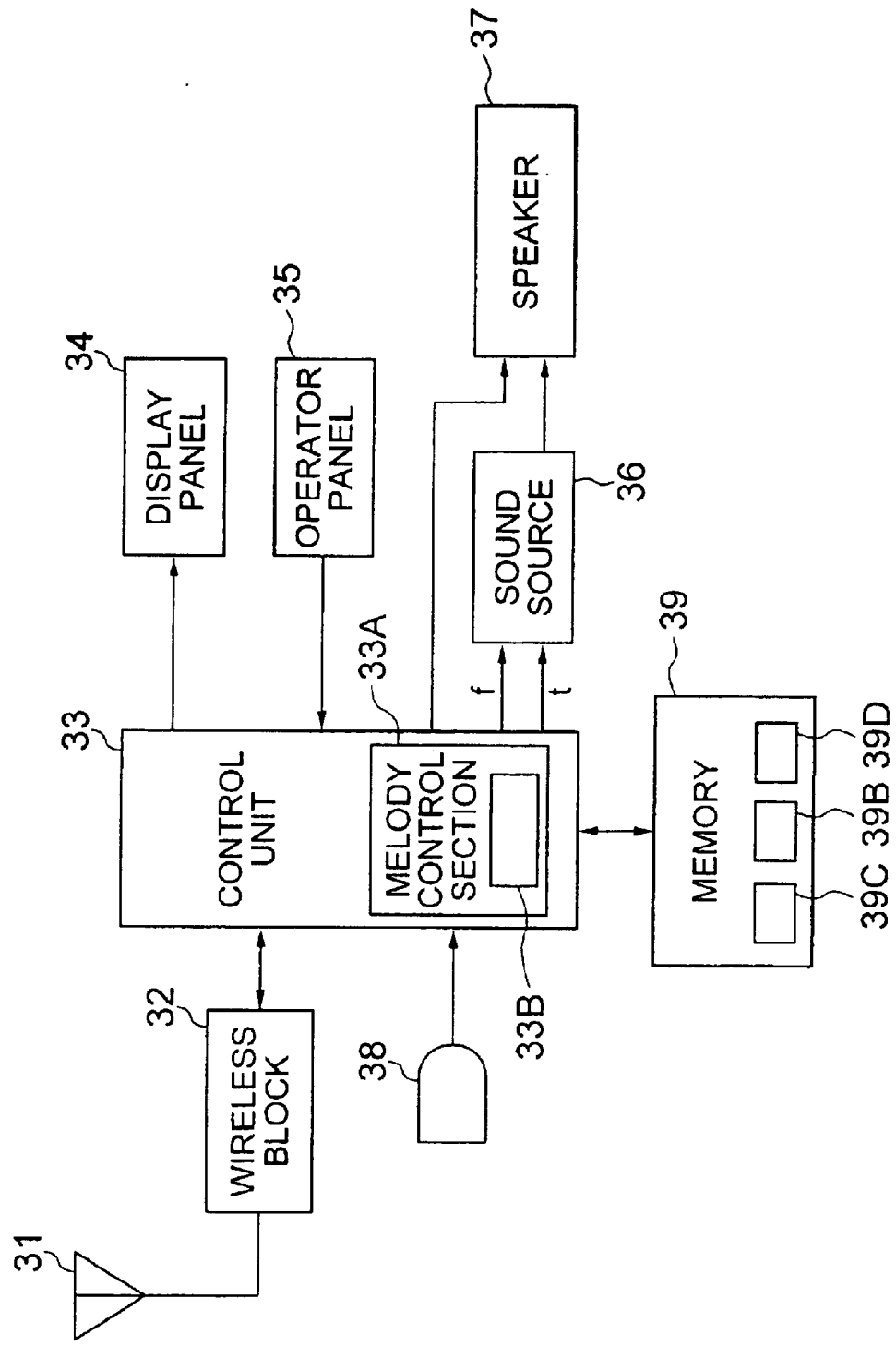

MELODY DATA

FIG. 13

PITCH DATA

| D7 | D6 | D5 | D4 | D3 | D2 | D1 | D0 |

OCTAVE DATA — SCALE DATA

OCTAVE DATA:
- $0_{16}$ : LOWER OCTAVE
- $1_{16}$ : MIDDLE OCTAVE
- $2_{16}$ : HIGHER OCTAVE
- $3_{16}$ : ARBITRARY
- $4_{16}$ : ARBITRARY
- OTHERS : PROHIBITED

SCALE DATA:
- $0_{16}$ : NO SOUND
- $1_{16}$ : Do
- $2_{16}$ : Do#
- $3_{16}$ : Re
- $4_{16}$ : Re#
- $5_{16}$ : Mi
- $6_{16}$ : Fa
- $7_{16}$ : Fa#
- $8_{16}$ : Sol
- $9_{16}$ : Sol#
- $10_{16}$ : La
- $11_{16}$ : La#
- $12_{16}$ : Si
- OTHERS : PROHIBITED

FIG. 14

NOTE DATA

| D7 | D6 | D5 | D4 | D3 | D2 | D1 | D0 |
|----|----|----|----|----|----|----|----|

PATTERN DATA (D7–D4)   NOTE DATA (D3–D0)

PATTERN DATA:
- $0_{16}$ : DEFAULT
- $1_{16}$ : SLUR
- $2_{16}$ : STACCATO
- OTHERS : ARBITRARY

NOTE DATA:
- $0_{16}$ : WHOLE NOTE
- $1_{16}$ : DOTTED HALF NOTE
- $2_{16}$ : HALF NOTE
- $3_{16}$ : DOTTED QUARTER NOTE
- $4_{16}$ : QUARTER NOTE
- $5_{16}$ : DOTTED OCTANT NOTE
- $6_{16}$ : OCTANT NOTE
- $7_{16}$ : SIXTEENTH NOTE
- OTHERS : ARBITRARY

MELODY PLAYING SYSTEM

BACKGROUND OF THE INVENTION (a) Field of the Invention

The present invention relates to a melody playing system and, more particularly, to a melody playing system which is suitable for use in a cellular phone and capable of storing melodies with a reduced storage capacity.

(b) Description of the Related Art

A cellular phone is known in the art which plays a melody stored therein as a call sign of the cellular phone. Referring to FIG. 1, a cellular phone includes a transmission/reception antenna 31 for signal transmission/reception between the cellular phone and a base station of the communication system. A wireless block 32 receives an electric wave through the antenna 31 for signal processing such as demodulation of the received wave, and also modulates a carrier wave with voice to generate a transmission wave. A control unit 33 controls the wireless 32 block as well as other blocks A display panel 34 is controlled by the control unit 33 to display a calling telephone number etc. An operator panel 35 including a plurality of key switches transfers data input by a user to the control unit 33.

A speaker 37 converts the electric signal generated by demodulation by the control unit 33 into voice. A microphone 38 converts the voice from a user into an electric signal. A storage device or memory 39 stores program data for operating the cellular phone in accordance with the function thereof. The storage device 39 includes therein a melody data block 39A for storing a melody played upon a call of the cellular phone, and stores a conversion table 39B to be used for converting the sound pitch data into frequencies.

The control unit 33 includes therein a melody control section 33A, which retrieves the melody data from the melody storage block 39A, and converts the sound pitch data in the retrieved melody into frequency data based on the conversion table 39B.

A sound source 36 is controlled by the melody control section 33A to generate a variety of specified frequencies, which regenerate sounds through the speaker 37 based on the frequency data and the sound time data.

The sound time data is used as a timing data, which instructs the sound source 36 to start and stop the sound (or tone). Referring to FIG. 2, the storage device 39 includes the melody data block 39A which stores a plurality of (10) melodies 01 to 10 each having a data structure 51 shown in FIG. 3.

Referring to FIG. 3, the melody data 51 includes a header section 52 for storing the number (n) of tones included in the melody, and a tone data section 53 for storing the plurality (n) of tone data [1] to [n] each having the pitch of the tone and the sound time length. The tone data [1] to [n] are arranged in the order of occurrence of the tones. In this text, the term "pitch" means the height of the tone determined by the frequency, the term "scale" means the scale level of the tone in each octave band, and the term "sound time length" is a time length between the start of the tone and the end of the tone.

The pitch data in the melody should include the octave data of the tone for specifying a lower octave band, a middle octave band or a higher octave band for the tone, as well as the scale data of the tone for specifying "Do", "Do#", "Re", "Re#", "Mi", "Fa", "Fa#", "Sol", "Sol#", "La", "La#" or "Si" for the tone in each of the octave bands.

Referring to FIG. 4, each pitch data in the tone data section 53 is stored as a code 0xFF to $(0\times23)_{16}$ which represents the scale of the tone such as "Do", Do#", . . . , "Si" as well as the octave band of the pitch. In addition, the code data includes information of "no sound" (0xFF) and "continue" (0xFE) instead of the pitch data if there is no tone at that sound time FIG. 5 is a table showing the code data of the tone in connection with the scale data and the frequency of the tone, wherein the code data corresponds to the frequency of the sound in a one-to-one correspondence. That is, each code is allocated to a corresponding frequency.

Table 1 shows the relative time length of each of the types of sound note used for indicating the tone, with the quarter note being set at "1".

TABLE 1

| Type of sound note | Relative sound time length |
| --- | --- |
| Whole note | 4 |
| Dotted half note | 3 |
| Half note | 2 |
| Dotted quarter note | 3/2 |
| Quarter note | 1 |
| Dotted octant note | 3/4 |
| Octant note | 1/2 |
| Sixteenth note | 1/4 |

FIG. 6 shows the relative time length for each of the notes tabulated above. As shown, the relative time length is categorized into eight classes The practical sound time length (Ts) for each of the notes is determined in terms of tempo (Tempo) and the relative time length (Rtime) by the following formula:

$$Ts = (60/Tempo) \times Rtime. \tag{1}$$

The term "tempo" is defined by the number of notes played in a minute or sixty seconds for indicating the degree of speed for playing the melody. Thus, for example, if the tempo is selected at 60, the tone of the quarter note continues for one second.

FIG. 7 is a table showing the sound time lengths of the notes in terms of "second" for each of the tempos of the melodies. As shown in this figure, eight standard tempos 60, 72, . . . , and 138 are used for playing melodies.

The term "no sound" means no note is played at that sound time. The no sound is herein categorized into two types including one defined as a stop note such as used as a quarter stop note or a whole stop note, and the other defined as a wait time which is a time interval between adjacent tones.

FIGS. 8A to 8D show different cases of the sound time length. Basically, the sound time length Ts is defined by a time interval between the start of the tone and the stop of the tone, as shown in FIG. 8A. As shown in FIG. 8B, a standard wait time Tw of 0.03 seconds is generally provided between adjacent tones. The practical wait time is determined by adjusting the standard wait time for playing like music.

For example, a "staccato" used as a encouraging function in the play of a musical instrument reduces the sound time length Ts by half, as shown in FIG. 8C, and the rest of the sound time length is added to the standard wait time Tw for obtaining the practical wait time. A "slur" used for continuation of tones prolongs the preceding sound time length Ts and removes the wait time Tw as shown in FIG. 8D.

By removing the wait time Tw, the melody sounds more smooth. The no-sound data as described above is treated as one of pitch data in the tone data section 53 shown in FIG. 3. For example, a pitch data of a normal tone is associated with a succeeding pitch data indicating a wait time.

The data for a wait time includes "no sound" data as a pitch data and 30 milliseconds as a sound time data. Thus, except for a "slur", two time data are specified for each of the notes, including the sound time length and the no-sound time (wait time) length.

A fixed melody or an original melody is generally used in a cellular phone as a call sign of the cellular phone. The fixed melody is stored in the cellular phone during fabrication thereof, whereas the original melody is composed by the user on the cellular phone.

The original melody is composed on the display panel 34 by key operations at the operator panel 35, and stored in the tone data section 39A of the storage device 39 via the melody control section 33A in the control unit 33. The data for the original melody can be modified arbitrarily by the user.

The preference of the melody used as a call sign depends on the users for their ages, genders etc. In particular, the preference of the tempo for the melody differs from user to user.

In the conventional melody playing system in the cellular phone, the change of the tempo for a melody is a time-consuming work, wherein the sound time length for each of the tones is to be recalculated. Especially, it is difficult or practically impossible for the user to change the tempo for the fixed melody in the cellular phone.

In the case of the original melody, the user may store the modified melody having a different tempo as a new original melody However, this increases the number of the modified melodies to be stored in the melody data block, and thereby necessitates a larger storage capacity for the melody data block in the storage device.

SUMMARY OF THE INVENTION

It is therefore an object of the present invention to provide a melody playing system suitable for use in a cellular phone, which is capable of allowing the change of the tempo for the melody with a limited increase of the storage device for the melody.

The present invention provides a melody playing system including a data storage device for storing a melody data representing a melody, the melody data including a tempo data representing a tempo of the melody and a plurality of tone data representing tones in the melody, the tone data including a pitch data representing a pitch of each of the tones and a note data representing a sound note of each of the tones;

a control unit for retrieving the tone data in an order of occurrence in the melody to calculate a sound time length for each of the retrieved tone data based on the tempo data and the note data; and a sound source controlled by the control unit to play the melody based on the pitch data and the sound time length.

In accordance with the melody playing system of the present invention, by storing a tempo data for a melody and calculating a sound time length for each of the tones in the melody based on the tempo data and the note data, the amount of data stored for playing the melody can be reduced significantly.

The above and other objects, features and advantages of the present invention will be more apparent from the following description, referring to the accompanying drawings.

BRIEF DESCRIPTION OF THE DRAWINGS

FIG. 4 is a table of the code data for the pitch of the sound tones shown in FIG. 3.

FIG. 5 is a table for the frequencies specified by the code data shown in FIG. 4.

FIG. 7 is a table of sound time lengths of the notes for different tempos.

FIG. 9 is a block diagram of a cellular phone having a melody playing system according to an embodiment of the present invention.

FIG. 13 is a schematic diagram showing the pitch data in the melody data storage section in the embodiment of the present invention.

FIG. 14 is a schematic diagram showing the note data in the melody data storage section in the embodiment.

PREFERRED EMBODIMENTS OF THE INVENTION

Figure 1:
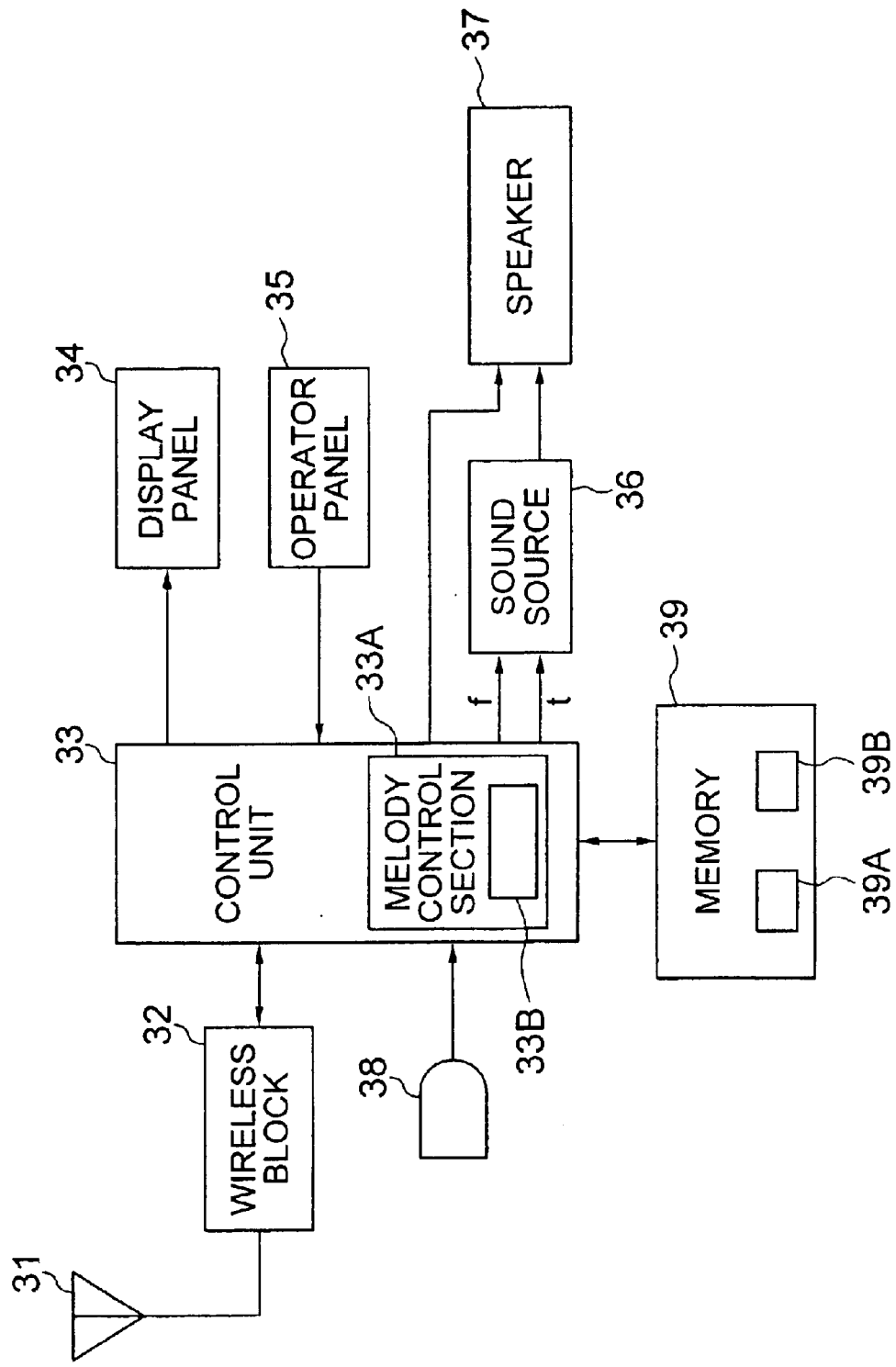
FIG. 1 is block diagram of a conventional cellular phone.
Figure 2:
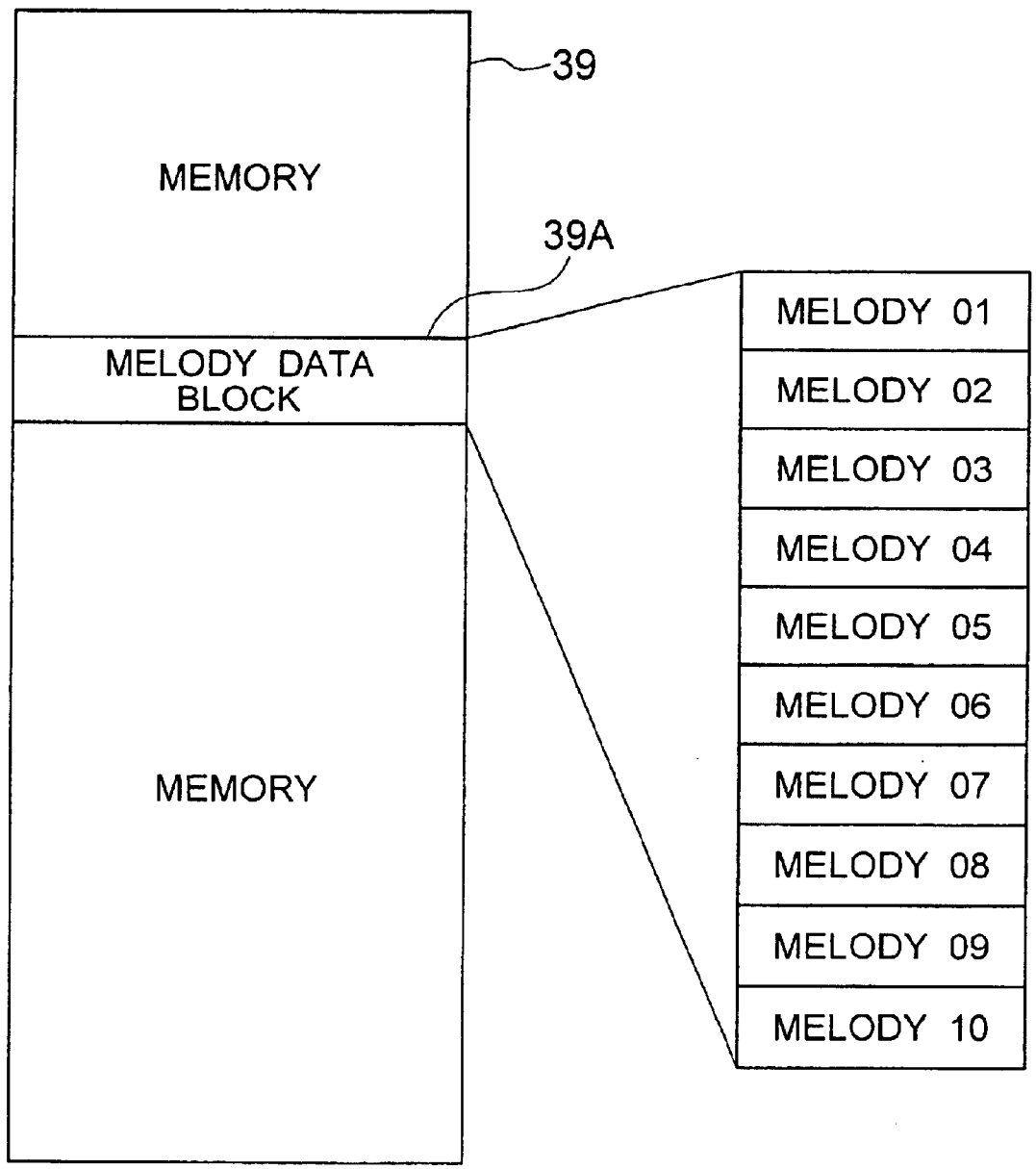
FIG. 2 is a schematic diagram of the storage device shown in FIG. 1.
Figure 3:
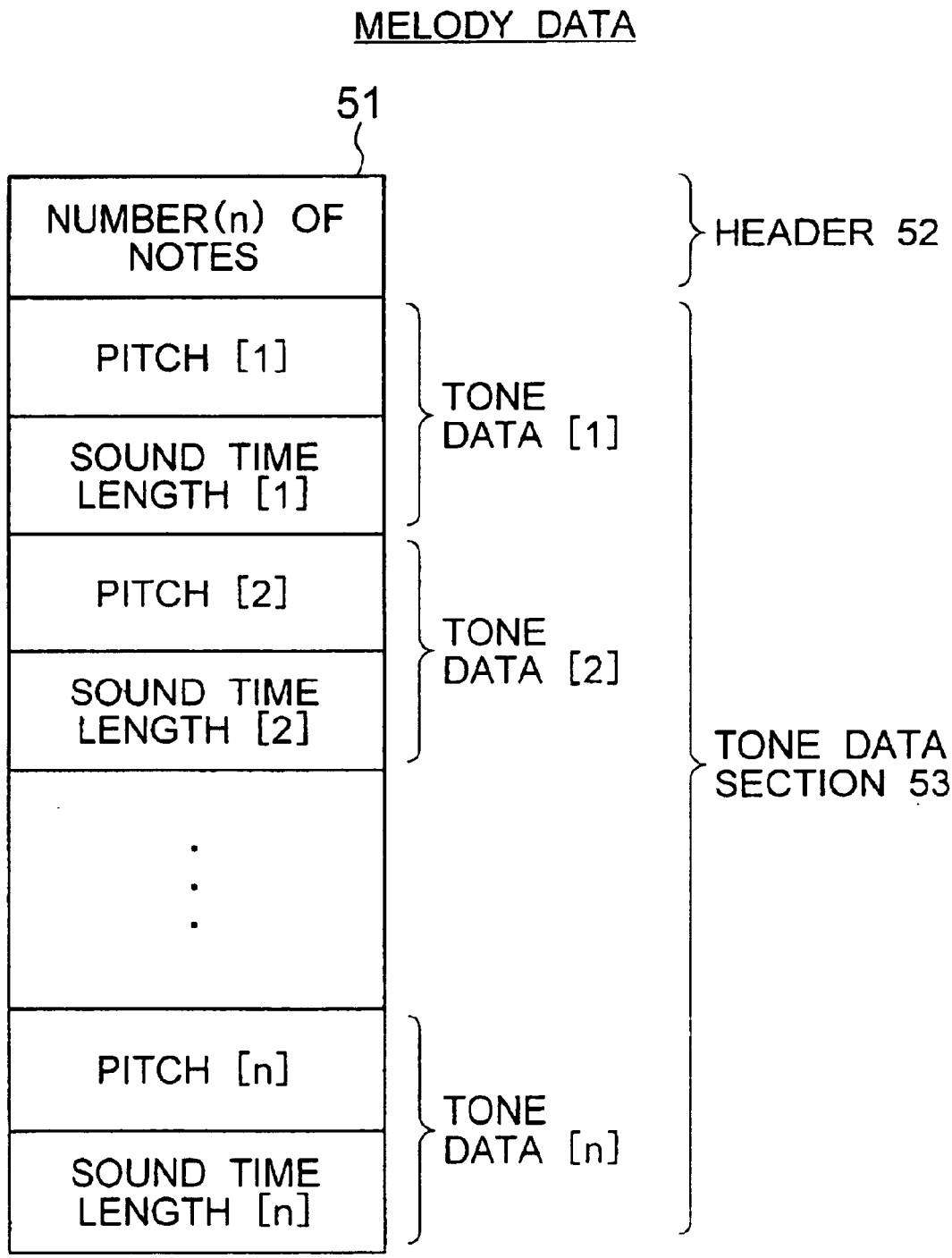
FIG. 3 is a schematic detailed diagram of the melody data structure of each melody shown in FIG. 2.
Figure 6:
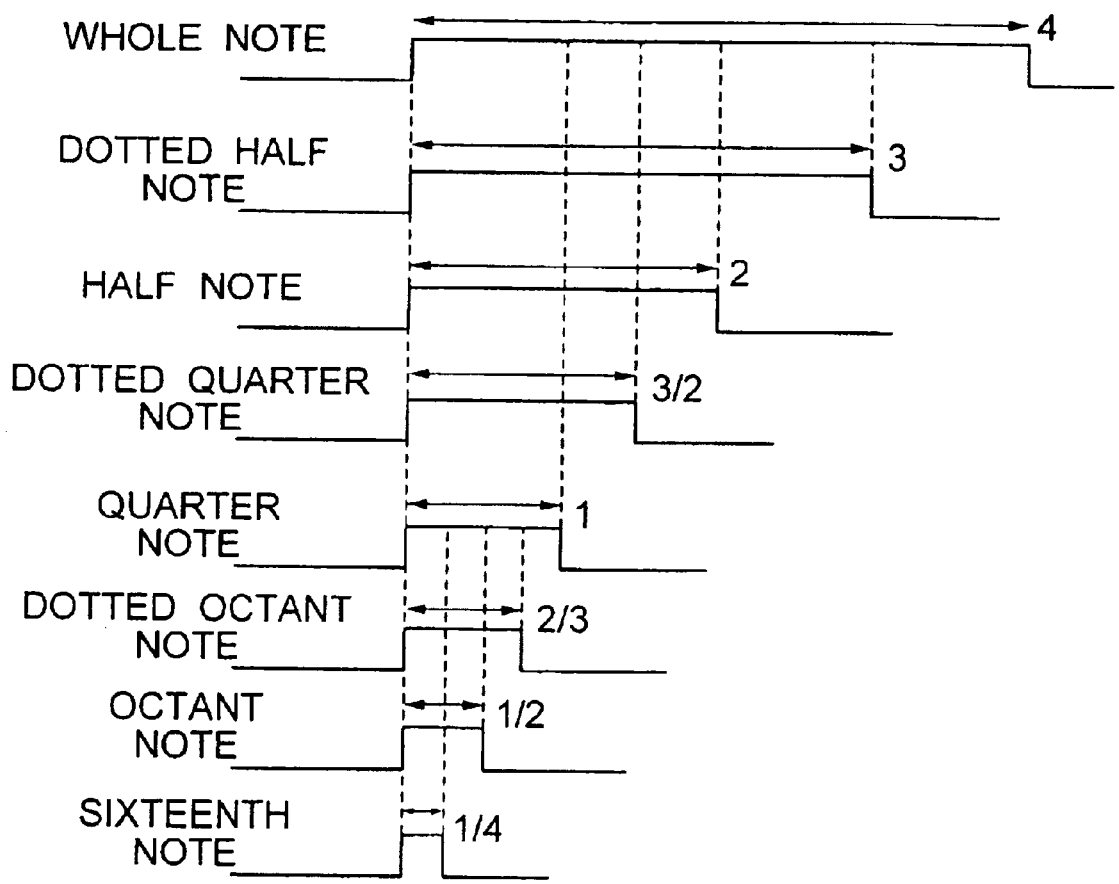
FIG. 6 shows relative time lengths of different types of notes.
Figure 8A:
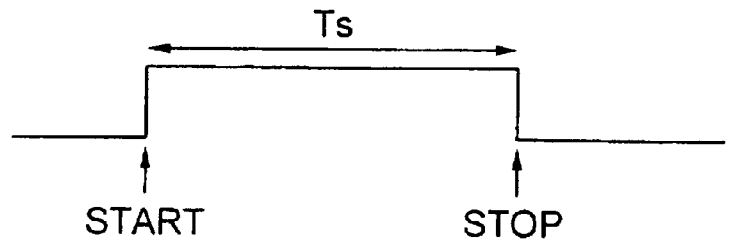
FIGS. 8A to 8D are schematic timing charts showing sound times and no-sound times.
Figure 8B:
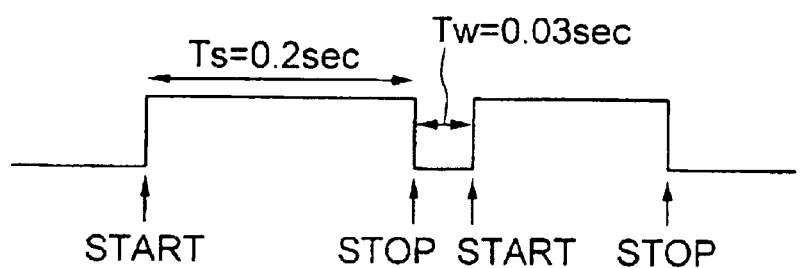
Figure 8C:
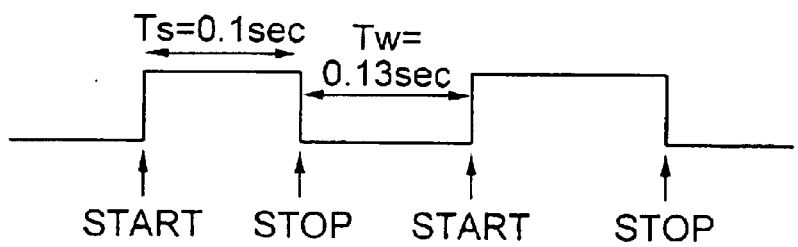
Figure 8D:
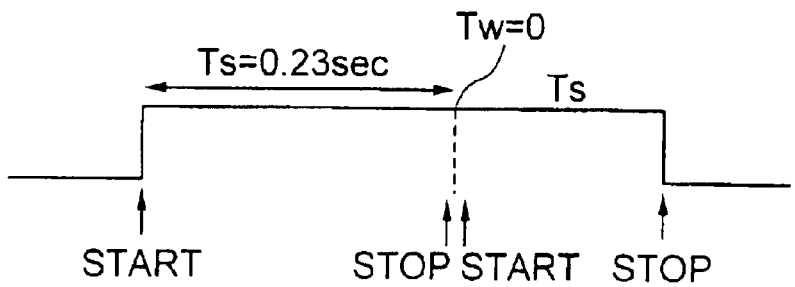

Now, the present invention is more specifically described with reference to accompanying drawings, wherein similar constituent elements are designated by similar reference numerals throughout the drawings.

Referring to FIG. 9, a cellular phone having a melody playing system according to an embodiment of the present invention is similar to the conventional cellular phone shown in FIG. 1 except that, in the present embodiment, the melody control section 33A includes a sound time length calculating section 33B, and the storage device 39 includes a melody data storage section 39C and a note-length table storage section 39D instead of the melody data storage section 39A in FIG. 1.

Figure 10:
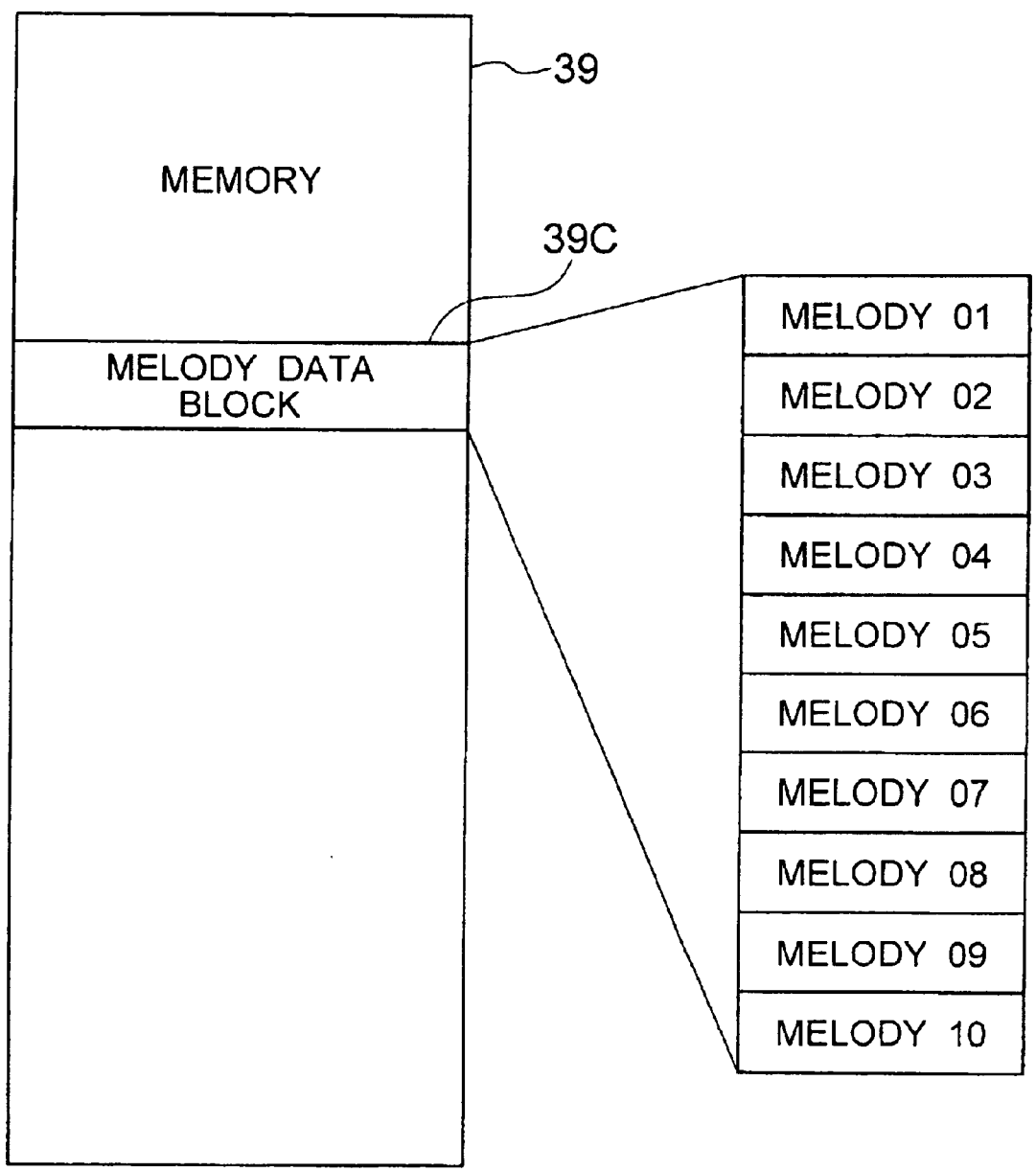
FIG. 10 is a schematic diagram of the storage device shown in FIG. 9.
Figure 11:
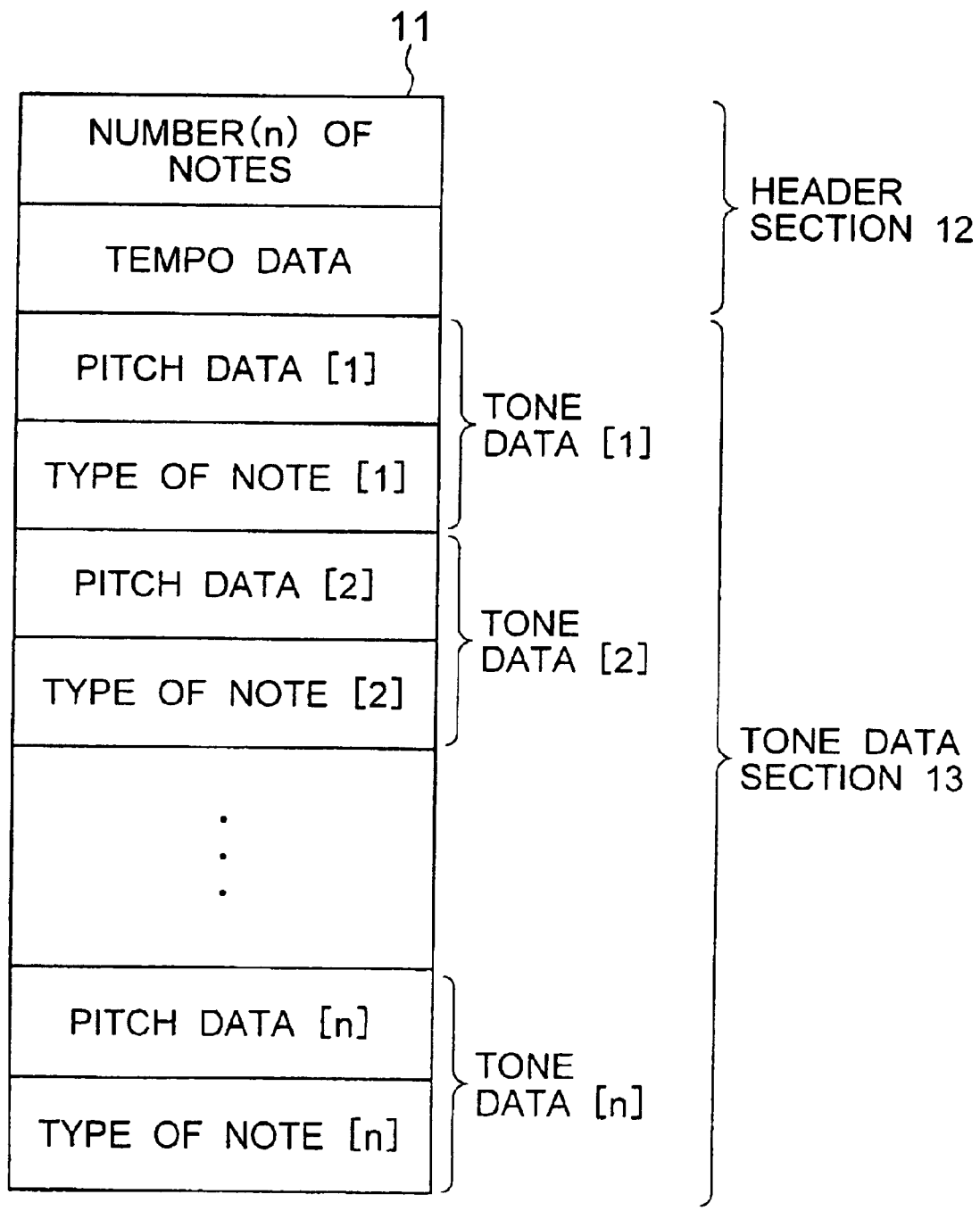
FIG. 11 is a schematic detailed diagram of the melody data structure shown in FIG. 10.

The note-length table storage section 39D stores Table 1 tabulating the relative time lengths for the eight notes. Referring to FIG. 10, the melody data storage section 39C stores different melody data 01 to 10 each including a data structure such as shown in FIG. 11. The data structure in each melody data includes a header section 12 for storing the number (n) of sounds or tones in the melody and a tempo data for specifying the tempo for playing the melody, and a tone data section 13. The tempo data specifies one of the eight tempos shown in FIG. 7.

The tone data section 13 stores tone data [1] to [n] in the order of occurrence of the tones, each tone data including a pitch data for specifying the pitch of the tone and a note data for specifying the type of the note such as a whole notes a quarter note or an octant note.

Figure 12:
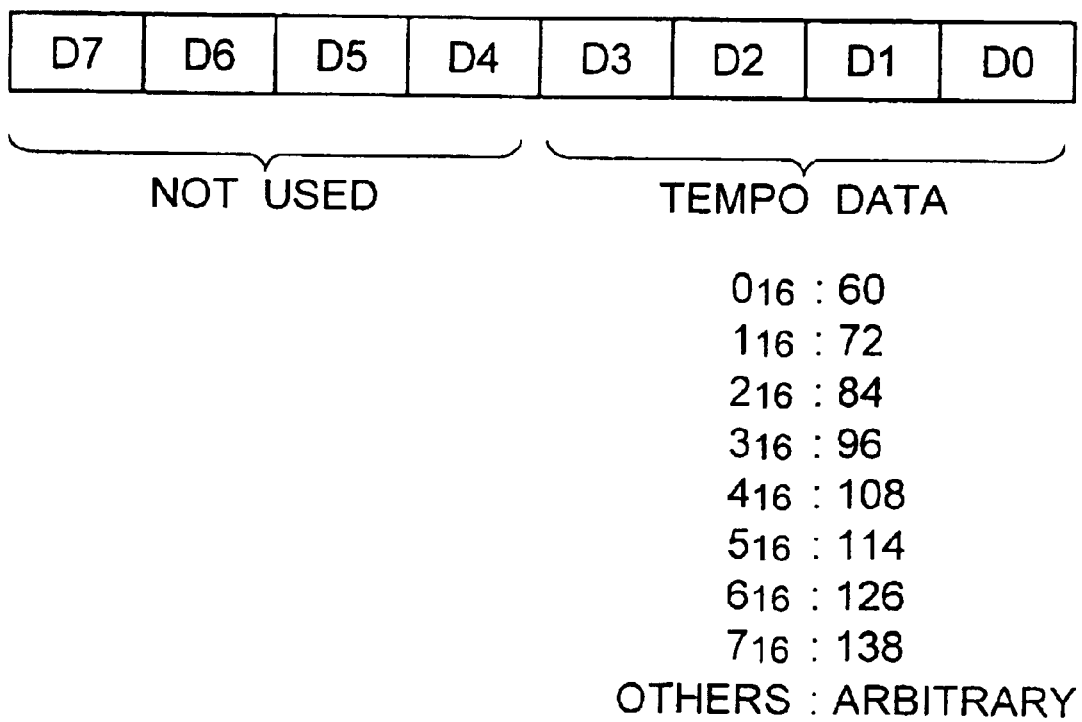
FIG. 12 is a schematic diagram showing the tempo data in the melody data storage section in the embodiment.

Referring to FIG. 12, the header section 12 has a 8-bit configuration including memory bits D0 to D7 for the tempo data. The less significant four bits D0 to D3 of the tempo data stored in the header section 12 are used for specifying the tempo of the melody among eight standard tempos 60, 72, ..., 138. Other codes for the bits D0 to D7 may be used by a designer for specifying arbitrary tempos other than the standard tempo.

Referring to FIG. 13, the pitch data stored in the tone data section 13 includes a scale data and an octave data. The less significant four bits D0 to D3 specify the scale of each tone by indicating "no-sound", "Do", "Do#", ..., or "Si". These tones are arranged in an ascending order of the code from zero to twelve. Other codes are prohibited herein. The more significant four bits D4 to D7 specify the octave band of the tone by indicating "lower octave", "middle octave", "higher octave" or one of other two arbitrary data, which may be specified by a designer. The other codes for bits D4 to D7 are prohibited herein.

The configuration of the pitch data including the scale data and the octave data enables the user to grasp the melody by the resemblance between the data and the constituent elements of the music, and thereby correct possible errors in the pitch data with more ease.

For example, if it is desired to modify a melody by shifting the tones therein by one octave, addition of "1" to the octave data of each tone is sufficient. This reduces an error during the modifying operation by the user.

Referring to FIG. 14, a note data of each tone stored in the tone data section 13 includes a note type data for specifying the type of the note and a pattern data for specifying additional information such as slur and staccato The less significant four bits D0 to D3 specify the note as "whole note", "dotted half note", ..., "sixteenth note" in an ascending order. The other codes for D0 to D3 may be used by a designer for specifying arbitrary note data. The more significant four bits D4 to D7 specify the pattern as "default" or "wait for 30 msec", "slur" and "staccato" in an ascending order. Other codes are used for arbitrary pattern data.

In the present embodiment, both the type of the note and the pattern information can be easily understood by observing the note data, whereas in the conventional technique the note data cannot be understood by those observing the sound time length except for the composer of the melody.

For example, if a quarter note is to be changed to an octant note, it is sufficient to change the type of the note in the bits D0 to D7 in the present embodiment, whereas the sound time length must be calculated for each of the tones based on the type of the note and the tempo in the conventional technique.

As described above, by storing the data for the type of note, scale data and octave data for each tone, the modification of the each tone can be performed without the need for conversion of the data.

The sound time length calculating section 33B in the melody control section 33A retrieves the type of the note, pattern data and the tempo data from the melody data block 39C, retrieves the relative time length (Rtime) of the tone based on the type of the note from the table of FIG. 7 in the note-length table storage section 39D, and calculates the sound time length based on the data shown in the table as follows:

$$Ts=(60/Tempo) \times Rtime - Tpatten \quad (2)$$

wherein Tpattern is the time length for a modification specified by the pattern data such as slur or staccato.

For example, if the pattern data is a "default", the wait time is 0.03 seconds. If the pattern data is a "slur", the wait time is zero second, whereas if the pattern data is a "staccato", the wait time is (60/Tempo)×Rtime/2. The sound time length calculating section 33B analyzes the pattern data and calculates the sound time length by subtraction of the wait time specified by the pattern data from the normal sound time length. The sound time length can be modified simply by changing the tempo data without a complicated calculation The melody control section 33A controls the sound source 36 to activate a timer disposed for specifying the sound time length, and to stop the sound at the timing of the time up by the timer.

The melody control section 33A then retrieves the pitch data from the tone data section 13 and determines the frequency of the tone based on the conversion table 39B for converting the code data of the pitch into the actual frequency. The sound source 36 generates each tone based on the frequency of the each tone for a time length based on the sound time length for playing the melody.

As described above, the melody control section 33A retrieves the tone data one by one from the tone data section 13, then determines the pitch of the tone and controls the start and stop of the tone. Thus, the tempo of the melody can be changed by merely changing the tempo data stored in the header section 12, without rewriting the data stored in the tone data section 13.

In addition, if the melody control section 33A changes the tempo data based on the instruction by the user upon performance of the melody, the melody can be played in a plurality of tempos substantially without increasing the storage capacity of the tone data section 13. This allows different tempos to be used for different purposes such as a call sign of the cellular phone or an alarm clock for the user. In addition, the melody control section 33A may change the tempo after performance of a specified number of tones. For example, if the tempo is increasingly raised during performance of a melody, the performance can be suitably used as an alarm clock.

In the above embodiment, the number of tones stored in the tone data section 13 can be reduced because the wait time is stored as a part of the associated tone, whereby the storage capacity used for storing the melody can be reduced substantially to a half compared to the conventional technique wherein the wait time is stored as a separate pitch data. The data structure having separately the pitch, type of the note, pattern of the note and the tempo closely resembles to the conventional concept of the constituent elements of the melody. Thus, the modification or correction of the melody can be performed with ease.

Figure 15:
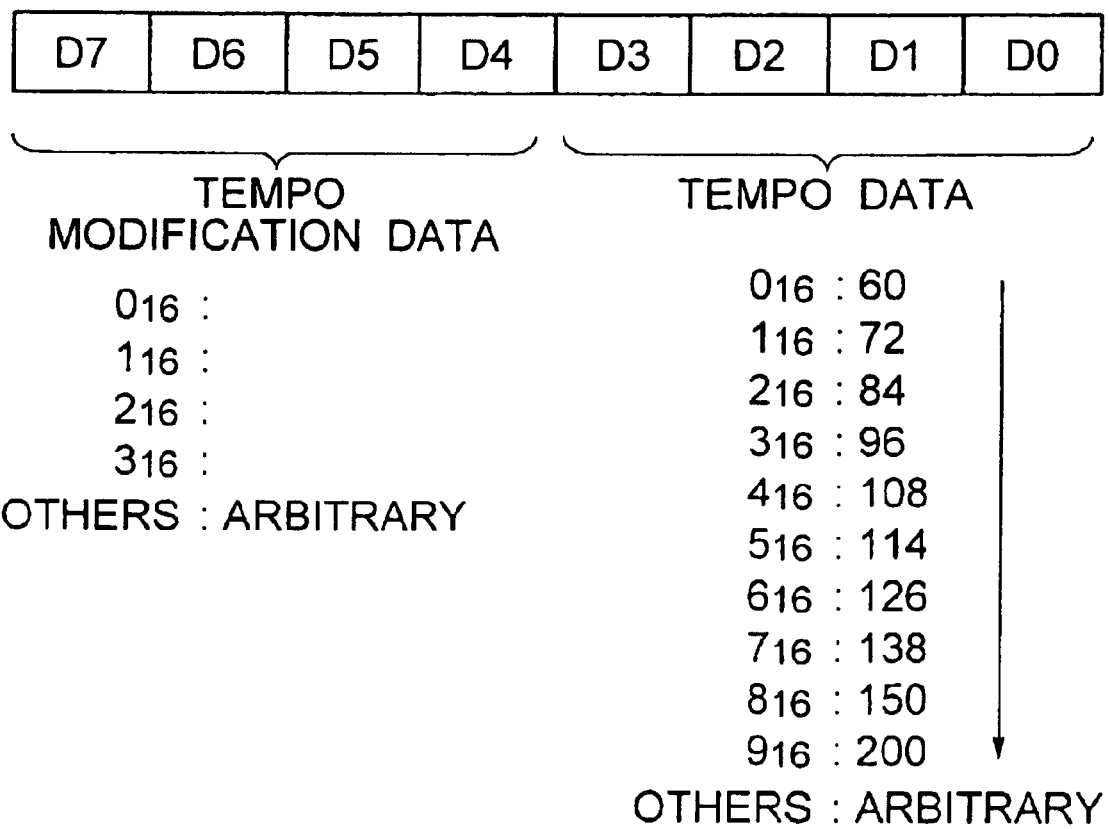
FIG. 15 is a schematic diagram showing the modified tempo data in the melody storage device in the present embodiment.

Referring to FIG. 15, a modified data structure for the header section 12 of the melody data includes a tempo data stored in the less significant four bits D0 to D3, and a tempo modification data 91 stored in the more significant four bits D4 to D7. The tempo data specifies a fixed tempo equal to one of ten standard tempos or one of flexible tempos selected by a designer The tempo modification data 91 specifies the fixed tempo by code "0000", a increasingly-quicker tempo by "0001", an increasingly-slower tempo by "0010", or a variable tempo such as a combination of these two types of the modification by "0011". An arbitrary tempo modification data may be also stored by a designer by the rest of the possible codes for bits D4–D7.

In an initial state of bits D4–D7, code "0000" is stored in a default for indicating the fixed tempo The user is allowed to change the default to select one of flexible tempo by a desired modification data, and the melody control section follows the modification data.

If the code "0001" is selected in bits D4–D7, for example, the melody control section 33A increments the tempo data stored in bits D0–D3 by "1" after performance of a specified number of notes, such as the number of all the notes in the melody stored in the header section 12 in FIG. 11. This allows an increase of the tempo after the melody is performed, and before a next performance of the same melody. That is, the tempo is increased at the timing of the repeat of the performance.

Figure 16:
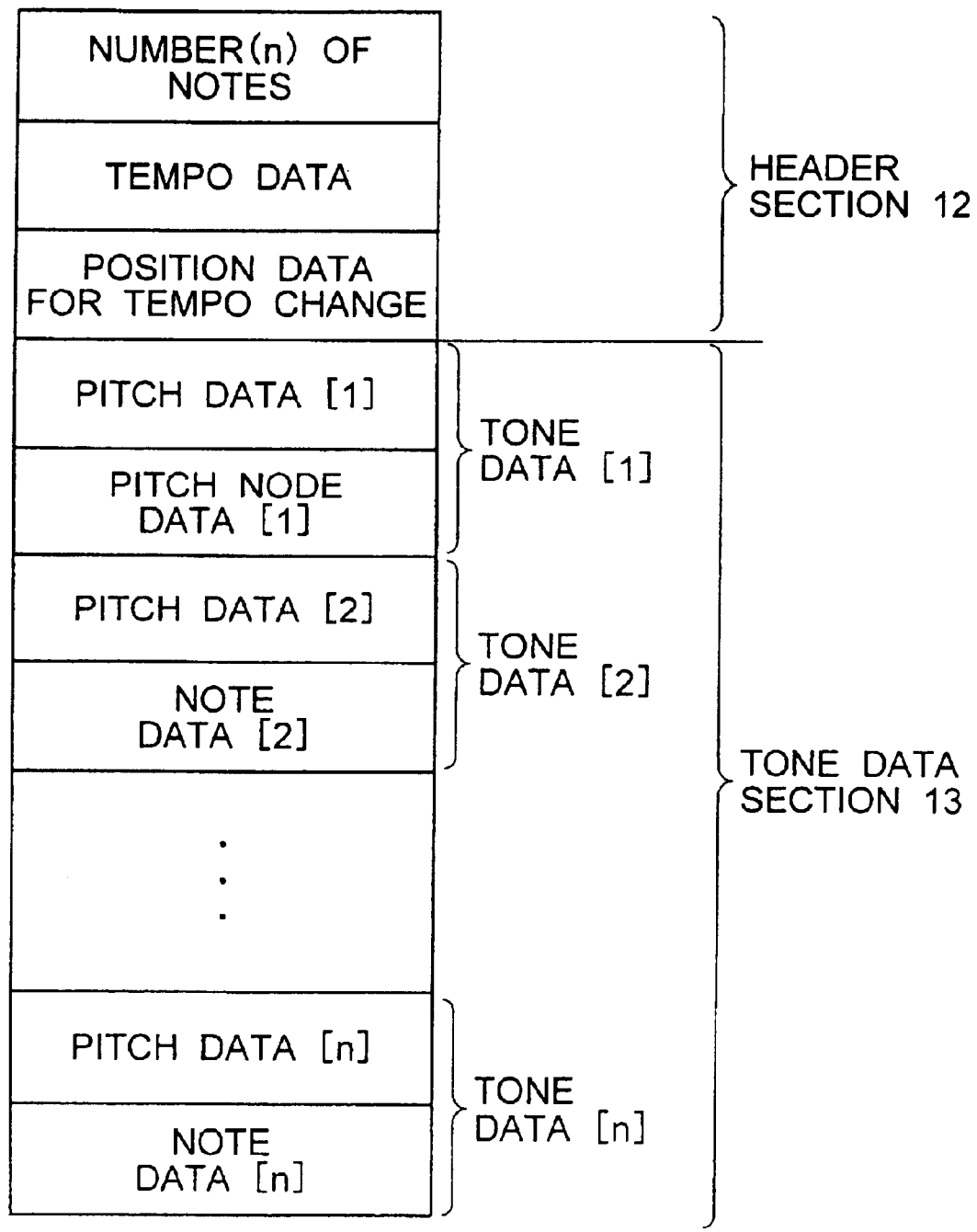
FIG. 16 is a schematic diagram showing the modified melody data structure in the embodiment.

Referring to FIG. 16, a modified melody data structure includes, in the header section 12, a tempo data specifying one of a plurality of tempos as well as a position data 101 for switching the tempo in the melody. The position data is set by the user for selecting the number of notes at which the tempo is switched. This allows the user to select the position of the tempo switching to store own original melody.

What is claimed is:

1. A melody playing system for a melody having a changeable tempo, comprising:
    a data storage device for storing a melody data representing a melody, said melody data including a tempo data representing a tempo of said melody and a plurality of tone data representing tones in said melody, said tone data including a pitch data representing a pitch of each of said tones and note data representing a sound note of each of said tones;
    a control unit for retrieving said tone data in an order of occurrence in said melody to calculate a sound time length for each of said retrieved tone data based on said tempo data and said note data; and
    a sound source controlled by said control unit to play said melody based on said pitch data and said sound time length;
    wherein the tempo of the melody can be changed by changing the tempo data without rewriting the tone data; and wherein said data storage device further stores a table tabulating relative time lengths for said sound notes used in said melody.

2. The melody playing system as defined in claim 1, wherein said pitch data includes a scale data and an octave data of said tone.

3. The melody playing system as defined in claim 1, wherein said pitch data includes a no-sound data as said note data.

4. The melody playing system as defined in claim 1, wherein said note data includes data for a type of each of said sound notes and a pattern data for specifying a wait time succeeding each of said sound notes.

5. The melody playing system as defined in claim 4, wherein said pattern data includes a default data, a slur data and a staccato data for said wait time.

6. The melody playing system as defined in claim 1, wherein said control unit changes at least one of said sound notes stored in said data storage device based on an external signal.

7. The melody playing system as defined in claim 1, wherein said control unit changes said octave data.

8. The melody playing system as defined in claim 1, wherein said control unit changes said tempo data.

9. The melody playing system as defined in claim 1, wherein said control unit changes said tempo data based on a tempo modification data.

10. The melody playing system as defined in claim 9, wherein said control unit changes said tempo data at a timing of repeat of said melody.

11. The melody playing system as defined in claim 9, wherein said control unit changes said tempo data after playing for a specified number of tone data.

12. The melody playing system as defined in claim 9, wherein said control unit changes said tempo data increasingly-quicker.

13. The melody playing system as defined in claim 9, wherein said control unit changes said tempo data increasingly-slower.

14. A cellular phone comprising the melody playing system as defined in claim 1.

15. The melody playing system of claim 1, wherein the table tabulating relative time lengths for said sound notes used in said melody comprises at least eight pairings of a type of sound note with a relative sound time length as follows: whole note, 4; dotted half note, 3; half note, 2; dotted quarter note 3/2; quarter note, 1; dotted octant note, 3/4; octant note, 1/2; sixteenth note, 1/4.

16. The melody playing system of claim 1, wherein relative time length (Rtime) is defined as follows:

$$Ts=(60/Tempo) \times Rtime$$

wherein "Ts" is practical sound time length for each note and "Tempo" is number of notes played in a minute for indicating degree of speed for playing the melody.

17. The melody playing system of claim 1, wherein sound time length Ts is calculated as follows:

$$Ts=(60/Tempo) \times Rtime-Tpattern$$

wherein "Tempo" is number of notes played in a minute for indicating degree of speed for playing the melody; Rtime is relative time length of the tone from the table; and Tpattern is time length for a modification specified by pattern data.

18. The melody playing system of claim 17, wherein the modification specified by pattern data is a slur or a staccato.

* * * * *